(12) United States Patent
Smith

(10) Patent No.: US 7,729,966 B1
(45) Date of Patent: Jun. 1, 2010

(54) TELEPHONE INTERFACE TO INTERNET PAYMENT PROCESSING SYSTEM

(75) Inventor: Travis L. Smith, Atlanta, GA (US)

(73) Assignee: RBS Lynk Incorporated, Atlanta, GA (US)

( * ) Notice: Subject to any disclaimer, the term of this patent is extended or adjusted under 35 U.S.C. 154(b) by 581 days.

(21) Appl. No.: 11/380,497

(22) Filed: Apr. 27, 2006

(51) Int. Cl.
*G06Q 99/00* (2006.01)
(52) U.S. Cl. .......................... 705/35; 705/14.1; 705/44; 707/104.1
(58) Field of Classification Search ................... 705/39, 705/44, 14, 26, 104.1, 25; 707/104.1, 10; 235/380
See application file for complete search history.

(56) References Cited

U.S. PATENT DOCUMENTS

| | | | | |
|---|---|---|---|---|
| 6,601,037 | B1 * | 7/2003 | Kolls .......................... | 705/14 |
| 6,938,013 | B1 * | 8/2005 | Gutierrez-Sheris ........... | 705/39 |
| 2004/0230610 | A1 * | 11/2004 | Gutierrez-Sheris ....... | 707/104.1 |

OTHER PUBLICATIONS

Elfriede Penz, Katja Meier-Pesti and Erich Kirchler; It's practical, but no more controllable: Social representations of the electronic purse in Austria; Sep. 22, 2003, Journal of Economic Psychology; 25, pp. 771-787.*

* cited by examiner

*Primary Examiner*—Behrang Badii
(74) *Attorney, Agent, or Firm*—Standley Law Group LLP

(57) ABSTRACT

A telephone interface to an Internet payment processing system. The interface may be installed on equipment used to process a card transactions. When a request for authorization is initiated, the interface dials a telephone number and establishes a connection to a communications server. The interface creates a message comprising the transaction data that conforms to the hypertext transport protocol (HTTP) and transmits it over the telephone line to the communications server. The communications server establishes a TCP/IP connection to a web server and the HTTP message is forwarded to the web server where transaction data is extracted from the HTTP message and formatted for submission to a card transaction processing network. The transaction is submitted and an authorization code approving or denying the request is returned from the network to the web server, to the communications server, and then to the merchant terminal using the telephone line.

16 Claims, 1 Drawing Sheet

TELEPHONE INTERFACE TO INTERNET PAYMENT PROCESSING SYSTEM

FIELD OF THE INVENTION

The present invention relates generally to systems and methods for processing card transactions. In particular, the present invention relates to an Internet payment processing system and method with a telephone interface that allows merchants to use a telephone connection to transmit card transaction data to the Internet payment processing system and method.

BACKGROUND OF THE INVENTION

Many merchants today rely on the Internet for processing of credit and debit card transactions. Point-of-sale (POS) terminals that merchants use may be equipped with a DSL, cable, or other components for establishing high-speed Internet connections to facilitate processing of card transactions using an Internet payment processing system. The terminals are equipped with software that extracts transaction data from every card that is swiped and then routes the data for processing using a high-speed Internet connection device. An Internet-based merchant that sells only on the Internet and uses a personal computer rather than a POS terminal for processing transactions may similarly rely on a high-speed Internet connection for processing of card transactions. The PC may be equipped with software that allows the PC to operate as a virtual POS that routes transaction data for processing using an Internet connection.

A high-speed Internet connection to an Internet payment processing system for processing card transaction provides many benefits to merchants. The connection is persistent so there is no need for the card processing device to make a telephone call. As a result, transaction response time is typically one to three seconds. Transactions are processed very quickly so customer wait time is reduced and transaction volume at the merchant site is increased. The addition of new terminals is quick and inexpensive. Finally, transactions are easily routed to any Internet payment gateway.

The same high-speed connection that provides many benefits to merchants when it functions can cause significant inconveniences to the merchant when it malfunctions. The loss of the connection—which can occur for a variety of reasons—results in a loss of the ability to process card transactions through the Internet payment processing system. The inability to process card transactions can be very costly to the merchant. The merchant may lose sales as he is forced to process transactions using another method. Some customers may not wait for a transaction to be processed using a slower method. If the merchant is unable to process transactions at the time of the sale, transaction data must be recorded for later processing. Depending upon the method used to record the transaction data (e.g., manually), it is possible that some of the information required for later processing may be lost or may not be recorded at all. Even if all of the necessary information is recorded for later processing of the transactions, the merchant will need to spend a considerable amount of time entering or transferring transaction data once the connection is functional again.

Another disadvantage of a high-speed Internet connection as an interface to an Internet payment processing system is the cost. The use of a high-speed connection requires the merchant to enter into a contract with an Internet Service Provider (ISP) that provides the necessary equipment and service. Customers incur a one time charge for equipment and installation of the equipment and a monthly charge for use of the connection. For merchants that do not process a large volume of transactions each month, the cost of installing and maintaining a high-speed connection can significantly reduce the merchant's profitability. For some merchants, a high-speed connection may not be cost effective.

Although high-speed connections for card transaction processing are very useful, there may be time when the connection is unavailable or it is not economical for a merchant to maintain the connection. Therefore, there is a need for an alternative interface to an Internet payment processing system.

SUMMARY OF THE INVENTION

The present invention is a telephone interface to an Internet payment processing system. The interface may be installed on a POS terminal or personal computer that a merchant uses to process card transactions for sales of goods or services. When a merchant submits a request for authorization of a card transaction, the interface dials a telephone number (such as an 800 number) and using a standard telephone line, establishes a connection to a communications server. Once the connection to the communications server is established, the interface creates a message comprising the transaction data that conforms to the hypertext transport protocol (HTTP) and transmits it over the telephone connection to the communications server. The communications server establishes a TCP/IP connection to a web server and the HTTP message is then forwarded to the web server. At the web server, the transaction data is extracted from the HTTP message and formatted for submission to a card transaction processing network. The transaction is submitted from the web server to the network and an authorization code approving or denying the request is returned from the network to the web server. An HTTP message comprising the authorization code is transmitted from the web server to the communications server using the TCP/IP connection and from the communications server to the merchant terminal using the telephone connection. The terminal or card transaction processing device then decodes the message to determine if the transaction is approved or denied.

The interface of the present invention may be installed on a card transaction processing device such as a terminal or computer that has a high-speed Internet connection to provide an alternate connection to an Internet payment processing when the high-speed connection is unavailable. It may also be used in place of a high-speed connection by merchants that do not want to incur the costs associated with installing and maintaining a high-speed connection. In either case, the present invention provides merchants with a cost-effective and convenient means for accessing an Internet payment processing system. The same message format is used to send a transaction to the Internet payment processing system regardless of whether the high-speed Internet connection or telephone connection is used for the transmission.

DESCRIPTION OF EXAMPLE EMBODIMENTS

Figure 1:
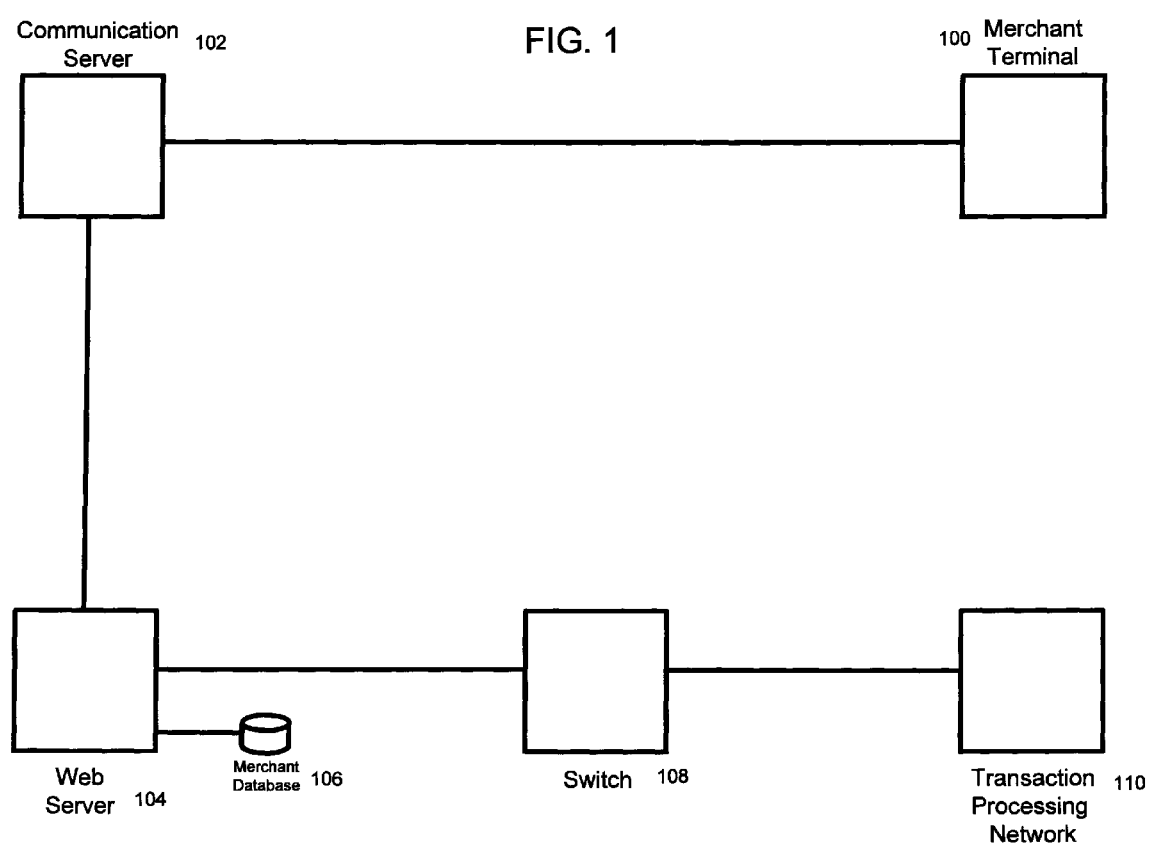
FIG. 1 is a block diagram of an Internet payment processing system with a telephone interface according to an example embodiment of the present invention.

Referring to FIG. 1, a block diagram of an Internet payment processing system with a telephone interface according to an example embodiment of the present invention is shown. An Internet payment processing system with a telephone interface according to the present invention comprises a card transaction processing device such as a merchant terminal or personal computer 100 equipped with a telephone line, a modem, and a software module for establishing a telephone connection to a communications server 102. The device 100 may optionally comprise components for establishing a high-speed Internet connection such as a DSL module or cable modem. A request for the connection to the communications server 102 is initiated when a merchant requests authorization for a card transaction. If a high-speed Internet connection is available, the Internet connection may be used for processing the transaction. If a high-speed Internet connection is not available, the card transaction processing device 100 dials a telephone number such as an 800 number to establish a telephone connection to the communications server 102. The software module at the card transaction processing device 100 assembles card transaction data to be transmitted to the communications server 102 for further processing.

In an example embodiment of the present invention, the software module at the card transaction processing device 100 organizes the card transaction data as a series of name-value pairs (NVP) in which each value of the transaction data is identified by a name. For example, transaction data may organized as follows:

TABLE 1

| Name | Value |
| --- | --- |
| Merchant ID: | 54321 |
| Store ID: | 876 |
| Account No.: | 9999-9999-9999-1111 |
| Expiration Date: | 07/08 |
| Transaction Amount: | $25.67 |

In an example embodiment of the present invention, a minimal amount of required data is transmitted from the merchant device. The minimal data identifies the merchant and the particulars of the transaction. Additional information that may be required to fully process the transaction is stored remotely from the merchant site, retrieved based on transaction data received from the merchant device, and added to the transaction data for processing of the transaction through a card transaction processing network. A reduction in the amount of data transmitted from the merchant's site results in a reduction of the amount of time required to process the transaction.

The card transaction processing device software module creates a HTTP message comprising the NVP transaction data and transmits it from the merchant device 100 to the communications server 102 using the connection that has been established. A HTTP message format is used so that the message may be transmitted using a high-speed Internet connection if one is available or the telephone connection if a high-speed Internet connection is not available. A high-speed Internet connection may not be available because the device 100 is not equipped with one or because the connection is not operational.

In an example embodiment of the present invention, the communications server 102 is a UTStarcom™ server that provides telecommunications features and functionality. The communications server 102 is equipped with a software module that accepts the HTTP message from the merchant device 100. Upon receipt of the HTTP message, the communications server 102 establishes a TCP/IP socket connection to a web server 104 and forwards the HTTP message to the web server 104. The messages are transmitted as HTTP Post messages according to HTML 4.0 standards. Inside the body of the messages, NVPs as described above are used to represent the transactional information.

In an example embodiment of the present invention, the web server 104 is an Apache™ Tomcat™ web server executing on Sun Microsystem® Java® Virtual Machine. The web server 104 comprises a software module that removes the HTTP portion of the message or extracts the card transaction data from the HTTP message and then prepares the NVP transaction data for processing in a card transaction processing network. Using the merchant identifier, the software module performs a lookup in a merchant database 106 to obtain additional data for processing the authorization request. The NVP message may be formatted in various ways. For example, data in the following format "terminal_id=123456&expiration_date=12/05&" as well as data in other fields relevant to the transaction may be included to provide the necessary data to acquire an authorization from the card transaction processing network or issuing network. The NVP message may be wrapped according to the HTTP Post message format.

Because the merchant information needed to process the authorization request is stored at the server and retrieved during processing of the transaction, there is no need for merchants to store their information locally. This feature allows the web server to ensure that all data is encrypted and secured and simplifies processing for merchants. More importantly, merchants need not worry about encrypting and securing their data because it is not maintained locally.

The software module prepares the transaction for processing and then transmits it from the web server 104 to the card transaction processing network 110 for authorization. The transaction may be routed through a processing switch 108 where the data are further formatted and prepared to be sent to the card transaction processing network 110 or issuing network. The switch 108 ensures that the necessary information is available in the transaction. In addition, it routes the transaction according to the card number used to initiate the transaction. The card transaction processing network 110 or issuing network receives the request from the switch 108 and processes the transaction responding with an approval or denial.

An authorization code approving or denying the request is returned from the card transaction processing network 110 to the web server 104. An HTTP message comprising the authorization code is transmitted from the web server 104 to the communications server 102 using the TCP/IP connection and from the communications server 102 to the merchant device 100 using the telephone line. The merchant device 100 then decodes the HTTP message to determine if the transaction is approved or denied.

Although the features and functionality for an example embodiment of the present invention are described in relation to a separate communications server 102, web server 104, and switch 108, the features and functionality could be provided using a single computer with one or more software modules that provide the features and functionality as described. One skilled in the art would recognize that various combinations of computers and application software may be used to provide the features and functionality of the present invention.

The interface of the present invention may be installed on any equipment or device that is used to process card transactions. Any type of card transaction such as a credit, debit, purchase, stored-value, or charge card transaction that requires authorization, approval, or any other type of communication from an issuer may be processed using the present invention. It may be used by merchants that have experienced an interruption in service of their high-speed connections or by merchants that do not want to incur the costs associated with installing and maintaining a high-speed connection. In either case, the present invention provides merchants with a cost-effective and convenient means for accessing an Internet payment processing system.

While example embodiments of the invention have been illustrated and described, various modifications and combinations can be made without departing from the spirit and scope of the invention. For example, the content of the various messages that are used to process transactions may be varied and fall within the scope of the present invention. Furthermore, the number of components and specific functionality of each component may be varied and fall within the scope of the present invention. Modifications, combinations, and equivalents to the system and method of the present invention are intended to be covered and claimed.

What is claimed is:

1. A system for processing card transactions comprising:
a device for processing card transactions wherein said device:
   (a) receives card transaction data formatted in name-value pairs;
   (b) in response to receiving said card transaction data, establishes a telephone connection to a communications server;
   (c) assembles said card transaction data in a hypertext transfer protocol message for transmission to said communications server using said telephone connection; and
wherein said communications server:
   (a) receives said card transaction data in said hypertext transfer protocol message from said device for processing card transactions, said hypertext transfer protocol message transmitted from said device for processing card transactions to said communications server using said telephone connection established by said device for processing card transactions;
   (b) in response to receiving said card transaction data in said hypertext transfer protocol message establishes a TCP/IP connection to a web server;
   (c) transmits said hypertext transfer protocol message to said web serve; and
wherein said web server:
   (a) receives said hypertext transfer protocol message assembled at said device and received at said communications server using said telephone connection;
   (b) in response to receiving said hypertext transfer protocol message, extracts said card transaction data from said hypertext transfer protocol message;
   (c) transmits said card transaction data to a transaction processing network for authorization;
   (d) receives from said transaction processing network an authorization code approving or denying said card transaction data;
   (e) creates a hypertext transport protocol message comprising said authorization code;
   (f) transmits to said communications server using said TCP/IP connection said hypertext transport protocol message comprising said authorization code; and
wherein said communications server further:
   (a) transmits to said device for processing card transactions using said telephone connection said hypertext transport protocol message comprising said authorization code; and
wherein said device further:
   (a) approves or denies said card transaction data according to said authorization code.

2. The system of claim 1 wherein said device is selected from the group consisting of point-of-sale terminals a personal computers.

3. The system of claim 1 wherein said device further comprises a high-speed Internet connection.

4. The system of claim 1 wherein said device communications server and said web server are located at the same computer.

5. The system of claim 1 further comprising a switch for transmitting said card transaction data to said transaction processing network for authorization.

6. The system of claim 1 wherein said card transaction data comprises transaction data for a card selected from the group consisting of a credit card, a debit card, a purchase card, a stored-value card, and a charge card.

7. A method for processing card transactions comprising:
   (a) receiving at a device card transaction data for processing card transactions, said card transaction data formatted as name-and-value pairs;
   (b) in response to receiving said card transaction data, establishing a telephone connection from said device for processing card transactions to a communications seller;
   (c) assembling said card transaction data in a hypertext transfer protocol message for transmission to said communications server;
   (d) receiving at said communications server card transaction data in said hypertext transfer protocol message, said hypertext transfer protocol message transmitted from said device for processing card transactions to said communications server using said telephone connection established by said device for processing card transactions;
   (e) in response to receiving said card transaction data in said hypertext transfer protocol message, establishing a TCP/IP connection from said communications server to a web server in response to receipt of said hypertext transfer protocol message;
   (f) transferring to said web server said hypertext transfer protocol message from said communications server;
   (g) in response to receiving at said web server said hypertext transfer protocol message, extracting at said web server said card transaction data from said hypertext transfer protocol message;
   (h) transmitting said card transaction data to a transaction processing network for authorization;
   (i) receiving at said web server from said transaction processing network an authorization code approving or denying said card transaction data;
   (j) creating at said web server a hypertext transport protocol message comprising said authorization code;
   (k) transmitting from said web server to said communications server using said TCP/IP connection said hypertext transport protocol message comprising said authorization code;
   (l) transmitting from said communications server to said device for processing card transactions using said telephone connection said hypertext transport protocol message comprising said authorization code; and
   (m) approving or denying at said device for processing card transactions said card transaction data according to said authorization code.

8. The method of claim 7 wherein receiving card transaction data from a device comprises receiving card transaction data from a device selected from the group consisting of point-of-sale terminals and personal computers.

9. The method of claim 7 wherein receiving card transaction data from a device comprises receiving card transaction from a device comprising a high-speed Internet connection.

10. The method of claim 7 wherein said communications server and said web server are located at the same computer.

11. The system of claim 7 wherein receiving card transaction data from a device comprises receiving transaction data for a card selected from the group consisting of a credit card, a debit card, a purchase card, a stored-value card, and a charge card.

12. A system for processing card transactions comprising:
a device for processing card transactions, said device comprising components for establishing a high-speed Internet connection and a telephone connection wherein said device;
   (a) receives card transaction data formatted as name-value pairs;
   (b) in response to receiving said card transaction data, establishes a telephone connection to a communications server if said high-speed Internet connection is not available;
   (c) assembles said card transaction data in a hypertext transfer protocol message for transmission to said communications server using said telephone connection; and
wherein said communications server:
   (a) receives said card transaction data in said hypertext transfer protocol message from said device for processing card transactions, said hypertext transfer protocol message transmitted from said device for processing card transactions to said communications server using said telephone connection established by said device for processing card transactions;
   (b) in response to receiving said card transaction data in said hypertext transfer protocol message establishes a TCP/IP connection to a web server;
   (c) transmits said hypertext transfer protocol message to said web server; and
wherein said web server:
   (a) receives said hypertext transfer protocol message assembled at said device and received at said communications server using said telephone connection;
   (b) in response to receiving said hypertext transfer protocol message, extracts said card transaction data from said hypertext transfer protocol message;
   (c) transmits said card transaction data to a transaction processing network for authorization;
   (d) receives from said transaction processing network an authorization code approving or denying said card transaction data;
   (e) creates a hypertext transport protocol message comprising said authorization code;
   (f) transmits to said communications server using said TCP/IP connection said hypertext transport protocol message comprising said authorization code; and
wherein said communications server further:
   (a) transmits to said device for processing card transactions using said telephone connection said hypertext transport protocol message comprising said authorization code; and
wherein said device further:
   (a) approves or denies said card transaction data according to said authorization code.

13. The system of claim 12 wherein said device is selected from the group consisting of point-of-sale terminals and personal computers.

14. The system of claim 12 wherein said communications server and said web server are located at the same computer.

15. The system of claim 12 further comprising a switch for transmitting said card transaction data to said transaction processing network for authorization.

16. The system of claim 12 wherein said card transaction data comprises transaction data for a card selected from the group consisting of a credit card, a debit card, a purchase card, a stored-value card, and a charge card.

* * * * *

UNITED STATES PATENT AND TRADEMARK OFFICE
CERTIFICATE OF CORRECTION

PATENT NO.         : 7,729,966 B1
APPLICATION NO.    : 11/380497
DATED              : June 1, 2010
INVENTOR(S)        : Travis L. Smith It is certified that error appears in the above-identified patent and that said Letters Patent is hereby corrected as shown below:

In Column 5, line 43, please delete "serve" and insert -- server --

In Column 6, line 4, please delete "a" and insert -- and --

In Column 6, line 8, please delete "device"

In Column 6, line 21, please delete "and-"

In Column 6, line 24, please delete "seller" and insert -- server --

Signed and Sealed this

Nineteenth Day of October, 2010

David J. Kappos
*Director of the United States Patent and Trademark Office*